United States Patent [19]

Johansson et al.

[11] 3,942,324
[45] Mar. 9, 1976

[54] HOT GAS ENGINE

[75] Inventors: Lennart Nils Johansson, Eskilstuna; Ragnar Karl Olof Gronvall, Borensberg, both of Sweden

[73] Assignee: Forenade Fabriksverken, Eskilstuna, Sweden

[22] Filed: July 12, 1974

[21] Appl. No.: 487,884

[52] U.S. Cl. ................. 60/517; 431/160; 431/215; 60/524
[51] Int. Cl.² .................................. F01B 29/10
[58] Field of Search ............ 60/517, 524, 685, 618, 60/620; 237/12.3 B; 123/122 A, 122 AA, 122 AB, 142; 431/11, 158, 160, 215

[56] References Cited
UNITED STATES PATENTS

| | | | |
|---|---|---|---|
| 1,110,724 | 9/1914 | Stewart | 123/122 A |
| 1,448,008 | 3/1923 | Smith | 123/122 A |
| 1,703,374 | 2/1929 | Voigt et al. | 123/122 A |
| 3,656,295 | 4/1972 | Fokker | 60/524 |

Primary Examiner—Martin F. Schwadron
Assistant Examiner—H. Burks
Attorney, Agent, or Firm—Eric Y. Munson

[57] ABSTRACT

A hot gas engine including an injector for introducing a mixture of air and fuel into the combustion chamber to heat the working medium which is circulated in a system of ducts. Fresh air for the combustion of the fuel is preheated in a heat exchanger by exhaust gases from the combustion chamber and conducted to the fuel injector. A heating system for passing a heat exchange fluid to a space to be heated surrounds the combustion chamber, and the heat exchange fluid is thus heated by heat exchange with the exhaust gases.

3 Claims, 1 Drawing Figure

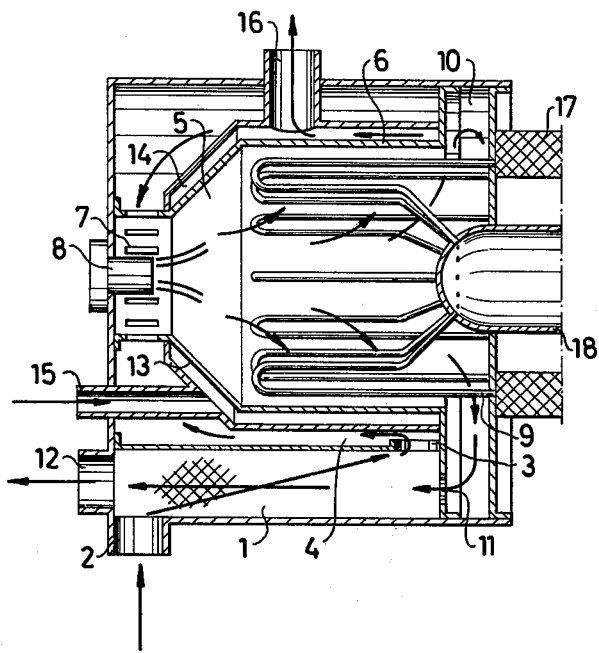

HOT GAS ENGINE

BACKGROUND OF THE INVENTION

The present invention relates to a hot gas engine, for instance the Stirling engine, in which a mixture of fuel and air is injected into the combustion chamber to supply external heat to the working medium in the engine. The fresh air is preheated in a heat exchanger by heat exchange with the use of exhaust gases from which is provided with chamber, the combustion means for the admission intake of the thus preheated fresh air and, which intake means are connected with the fresh air outlet of the heat exchanger through a channel.

According to the working principle of such hot gas engines the completely enclosed working medium is circulated on the one hand through a heater associated with the and on the, through a cooler as well as a regenerator situated therebetween. Water is usually used as cooling medium. To obtain optimum efficiency and performance of a hot gas engine, the cooling water temperature should be as low as possible, and consequently the difference between the temperatures of the entering and the leaving cooling water will also be very small. For this reason the cooling water in the hot gas engine cannot be used for heating purposes without substantially increasing the cooling water temperature and said temperature difference with consequent great losses in engine efficiency and performance. This is in contrast to the high temperature of the cooling water from the cooling gaskets in conventional explosion engines.

Heating of a space in conjunction with a hot gas engine, for instance a boat cabin or the interior of a vehicle, must thus be accomplished by the use of a special heating equipment such as a space heater, or other separate heating device.

SUMMARY OF THE INVENTION

The present invention, contemplates using the hot gas engine and the specific qualities thereof also for heating purposes by a better utilization of the combustion heat developed in the combustion chamber of the engine. With an arrangement according to the invention the cost and space of an auxilliary heater for heating the selected space is saved. In addition, the operating cost for heating said the desired space is reduced. With a preferred embodiment of the invention, an increased combustion chamber life is also achieved.

The present invention thus relates to a hot gas engine for external combustion of a fuel with air, which air is preheated by exhaust gases in a heat exchanger, the heat of the thus preheated air being partly used for heating purposes. The characteristics of the invention that have made said advantages possible are the provision of a second heat exchanger between the air preheater and the air intake of the combustion chamber for heat exchange between the preheated combustion air and a separate medium for heating purposes.

Said second heat exchanger comprises a medium passage means provided within and in heat exchange relationship with the channel connecting the fresh air outlet of the preheater with the combustion chamber intake means and is preferably disposed generally concentrically around said combustion chamber.

In a preferred embodiment of the invention the medium passage means is disposed generally adjacent to those parts of the combustion chamber that are particularly exposed to combustion heat, causing a heat exchange to occur also between said medium passage means and the combustion chamber wall in addition to producing increased combustion chamber life.

In a particularly suitable embodiment of the invention the medium to be heated is introduced in that part of the combustion chamber that is located in the vicinity of the fuel injector means causing the coldest medium to meet the hottest exhaust gases. This means that the length of life of this particularly exposed part of the combustion chamber is increased.

BRIEF DESCRIPTION OF THE DRAWING

The attached drawing is a schematic sectional view of the heater section of a hot gas engine adapted for using part of the heat of the preheated fresh air for heating purposes.

DESCRIPTION OF A PREFERRED EMBODIMENT

The heater section of the engine is provided with a heat exchanger 1 functioning as a preheater of the combustion air with an inlet 2 and an outlet 3 for fresh air. The outlet 3 opens out into a space or channel 4 surrounding a combustion chamber 5. Said combustion chamber is provided with annularly disposed inlet openings 7 for the intake of preheated fresh air, which openings surround an injector nozzle 8 for liquid fuel. Within said combustion chamber 5 there are annularly disposed along the chamber wall 6 heater tubes 9, through which tubes the completely enclosed working medium of the engine (helium, hydrogen or other gas) is flowing circulated. The heater tubes 9 are heated partly by heat radiation and partly by convection, as the exhaust gases are streaming pass and between the tubes 9 to a space 10 surrounding said tubes, which space is connected with the inlet 11 of the heat exhcanger for the exhaust gases that are leaving the heat exhcanger via the outlet 12. The heater tubes 9 are connected with a regenerator 17 and the upper part of a cylinder 18 in accordance with the principal construction of a hot gas engine.

In the space or channel 4 surrounding the combustion chamber 5 is arranged a second channel 14 surrounding and in close relation with said chamber. The channel 14 is swept by preheated exhaust air, and inside the channel there is a medium for heating purposes. This second channel 14 has an inlet 15 and an outlet 16 and is lying close to particularly exposed parts of the combustion chamber, such as section 13 near the injector nozzle 8.

It is previously known to use the fresh air introduced for the combustion of the injected fuel and preheated by the exhaust gases for diesel heating purposes by drawing off part of the preheated fresh air immediately ahead of the combustion chamber and supplying this air to the space to be heated. However, the volume of air passed through the heat exchanger must in such a case be increased in proportion to the volume of air drawn off for heating purposes. Such a process thus has the disadvantage of making the combustion process dependent on the heat demand because of variations in the volume of combustion air. The proper fuel/air ratio is important from combustion economy point of view. Hence the ratio of fuel and air must be adjusted to the degree of heating desired at every particular occasion, which calls for a very complicated control device.

However, with a device according to the invention, where the heat is drawn off through a special heat exchanger situated between the air preheater and the combustion chamber, the combustion process becomes substantially independent of the heating demand, as here the volume of combustion air is constant while the temperature of the air varies instead. The proper ratio of fuel and air is therefore always obtained regardless of how much heat is being drawn off from the preheated air. This is very advantageous as the heating device does not negatively affect the capacity of the hot gas engine.

Another advantage inherent in the device of the present invention results from the fact that the heating system may be operated with media free of compulsion, e.g. fresh air or water, and is not tied to exhaust gas. In the latter case the channel 14 together with a radiator or a water/air heat exchanger is part of a circulation circuit. It is also possible to use circulating cabin air, optionally mixed with fresh air, as the medium in channel 14. The air heated in the channel 14 may be mixed with cold air before being blown into the space to be heated. The desired temperature is obtained through adjustable regulating valves in the hot and cold air pipes.

Because of the channel 14 being situated close to the combustion chamber 5 and thus close to those parts of the combustion chamber that are particularly exposed to combustion heat, the usable life of the combustion chamber is increased.

While the present disclosure presents a specific embodiment of the invention, it is understood that a variety of modifications and changes may be devised without departing from the spirit and scope of the invention. The channels 4 and 14 are thus not limited to the shape and location illustrated on the drawing even if this particularly preferred embodiment gives the best result of the heat and thus the greatest efficiency as well as increased combustion chamber life. The channel 14 may be located in the space 4 surrounding the combustion chamber 5, for instance in the immediate vicinity thereof but not in absolute contact therewith.

Similarly the heater part of the engine may be located above the cylinder without changing the principal idea of the invention.

What is claimed is:

1. A hot gas engine in combination with a combustion chamber for generating a heating medium to heat a selected space, comprising:
   a. injector means for injecting fuel into said combustion chamber;
   b. intake means for passing combustion air from the atmosphere to said injector means;
   c. means for passing exhaust gas from said combustion chamber in heat exchange relationship with said intake means; and
   d. passage means for passing a heat exchange fluid from an intake to an outlet to heat a selected space, said air passage means being disposed in heat exchange relationship with said air intake means and said combustion chamber.

2. A hot gas engine according to claim 1, in which said passage means is disposed substantially concentrically about the combustion chamber.

3. A hot gas engine according to claim 1, in which a portion of said passage means is disposed adjacent the fuel injector means.

* * * * *